United States Patent
Li et al.

(10) Patent No.: US 9,879,186 B2
(45) Date of Patent: Jan. 30, 2018

(54) REFORMATE HYDROTREATMENT METHOD

(71) Applicants: CHINA PETROLEUM & CHEMICAL CORPORATION, Beijing (CN); HUNAN CHANGLING PETROCHEMICAL SCIENCE AND TECHNOLOGY DEVELOPMENT CO., LTD, Yueyang, Hunan (CN)

(72) Inventors: Hua Li, Hunan (CN); Jianping Liu, Hunan (CN); Xichun She, Hunan (CN); Xiaojun He, Hunan (CN); Qinghua Li, Hunan (CN); Qingling Chen, Hunan (CN); Lei Jiang, Hunan (CN); Zhiyu Zeng, Hunan (CN); Qingpin Yang, Hunan (CN); Chengli Liu, Hunan (CN)

(73) Assignees: CHINA PETROLEUM & CHEMICAL CORPORATION, Beijing (CN); HUNAN CHANGLING PETROCHEMICAL SCIENCE AND TECHNOLOGY DEVELOPMENT CO., LTD, Yueyang, Hunan (CN)

( * ) Notice: Subject to any disclaimer, the term of this patent is extended or adjusted under 35 U.S.C. 154(b) by 211 days.

(21) Appl. No.: 14/430,456

(22) PCT Filed: Sep. 18, 2013

(86) PCT No.: PCT/CN2013/083786
§ 371 (c)(1),
(2) Date: Mar. 23, 2015

(87) PCT Pub. No.: WO2014/044195
PCT Pub. Date: Mar. 27, 2014

(65) Prior Publication Data
US 2015/0247098 A1    Sep. 3, 2015

(30) Foreign Application Priority Data

Sep. 21, 2012  (CN) .......................... 2012 1 0357113

(51) Int. Cl.
*C10G 45/00*  (2006.01)
*C10G 59/02*  (2006.01)
(Continued)

(52) U.S. Cl.
CPC .......... *C10G 45/00* (2013.01); *B01F 3/04099* (2013.01); *B01F 5/0476* (2013.01);
(Continued)

(58) Field of Classification Search
None
See application file for complete search history.

(56) References Cited

U.S. PATENT DOCUMENTS 3,657,112 A    4/1972    Franz et al.
4,179,470 A    12/1979   Mischenko et al.
(Continued)

FOREIGN PATENT DOCUMENTS

CN    1004421 B    6/1989
CN    1131152 A    9/1996
(Continued)

*Primary Examiner* — Tam M Nguyen
(74) *Attorney, Agent, or Firm* — Novick, Kim & Lee, PLLC; Allen Xue

(57) ABSTRACT

Provided is a reformate hydrotreatment method, the method comprising: under liquid phase hydrotreatment conditions, bringing the reformate and a catalyst having a catalytic hydrogenation effect into contact in a hydrogenation reactor, the hydrogen used in the hydrotreating process at least partially coming from the hydrogen dissolved in the reformate. According to the method of the present invention, the reformate separated from a reformate products separating tank can directly undergo liquid phase hydrotreatment; therefore not only can the hydrogen dissolved in the refor-
(Continued)

mate be fully utilized, but the olefins in the reformate can also be removed, while eliminate the requirements for recycle hydrogen and a recycle device thereof. The reformate obtained by the method of the present invention reduces the bromine index to below 50 mgBr$_2$/100 g, and has an arene loss of less than 0.5 wt %.

13 Claims, 7 Drawing Sheets

(51) Int. Cl.
    B01J 19/24      (2006.01)
    C10G 35/04      (2006.01)
    C10G 49/00      (2006.01)
    C10G 63/02      (2006.01)
    B01J 4/00       (2006.01)
    B01J 8/06       (2006.01)
    B01J 8/00       (2006.01)
    B01J 8/02       (2006.01)
    B01J 8/04       (2006.01)
    B01F 5/04       (2006.01)
    B01F 3/04       (2006.01)

(52) U.S. Cl.
    CPC .............. B01J 4/004 (2013.01); B01J 8/009 (2013.01); B01J 8/025 (2013.01); B01J 8/0278 (2013.01); B01J 8/0457 (2013.01); B01J 8/065 (2013.01); B01J 19/2415 (2013.01); C10G 35/04 (2013.01); C10G 49/00 (2013.01); C10G 49/007 (2013.01); C10G 59/02 (2013.01); C10G 63/02 (2013.01); B01F 2003/04914 (2013.01); B01J 2208/00176 (2013.01); B01J 2208/00539 (2013.01); B01J 2208/00557 (2013.01); B01J 2208/00911 (2013.01); B01J 2219/0004 (2013.01); B01J 2219/00038 (2013.01); B01J 2219/00103 (2013.01); B01J 2219/24 (2013.01); C10G 2300/42 (2013.01)

(56) References Cited

U.S. PATENT DOCUMENTS

| 4,483,766 A | * | 11/1984 | James, Jr. | B01J 8/12 208/101 |
| 6,428,686 B1 | | 8/2002 | Ackerson et al. | |
| 2004/0210097 A1 | * | 10/2004 | Chau | B01J 8/009 585/520 |

FOREIGN PATENT DOCUMENTS

| CN | 1049001 C | 2/2000 |
| CN | 1288777 A | 3/2001 |
| CN | 1418876 A | 5/2003 |
| CN | 1580197 A | 2/2005 |
| CN | 101274922 A | 10/2008 |
| CN | 101280217 A | 10/2008 |
| CN | 101724443 A | 6/2010 |
| CN | 101724444 A | 6/2010 |
| CN | 201644076 U | 11/2010 |
| CN | 101942319 A | 1/2011 |
| CN | 101942326 A | 1/2011 |
| CN | 101992048 A | 3/2011 |
| CN | 101993719 A | 3/2011 |
| CN | 101993721 A | 3/2011 |
| CN | 102039104 A | 5/2011 |
| CN | 102041035 A | 5/2011 |
| CN | 102309932 A | 1/2012 |
| CN | 102311790 A | 1/2012 |
| CN | 102311791 A | 1/2012 |
| JP | 2000-256677 A | 9/2000 |
| WO | 2004/103539 A2 | 12/2004 |
| WO | 2006/039568 A1 | 4/2006 |
| WO | 2006/055609 A1 | 5/2006 |
| WO | 2006/102534 A2 | 9/2006 |
| WO | 2010/042794 A2 | 4/2010 |
| WO | 2011/068753 A1 | 6/2011 |

* cited by examiner

REFORMATE HYDROTREATMENT METHOD

FIELD OF THE INVENTION

The present invention relates to a method for hydroprocessing reformate.

BACKGROUND OF THE INVENTION

Catalytic reforming is one of the major processes for petroleum refining, and is a process in which raw oil such as naphtha is transformed into reformate rich in aromatics at specific temperature and pressure in presence of hydrogen and catalyst, and hydrogen gas is obtained as a byproduct. The reformate obtained through gas liquid separation of the mixture produced in catalytic reforming may be directly used as an additive for vehicle fuels; alternatively may be used for producing chemicals such as benzene, methyl benzene, and dimethyl benzene etc through an aromatics extraction process.

Reformate not only is rich in fractions of aromatics and solvent oil, but also contains a few olefins. Therefore, it is necessary to remove the olefins so as to produce qualified products of aromatics and solvent oil. Furthermore, in recent years, as the developing of wide fraction reforming technique and the increasing of the reaction severity, the olefin content in reformate increased accordingly. Therefore, the necessity of removing olefins from reformate is more obvious.

At present, the methods for removing olefins from reformate include clay adsorption refining, and post-hydrogenation for distillate or full range of reformate. For clay adsorption refining, there exist the drawbacks that the adsorptive capacity of clay is limited, and the waste clay can not be regenerated. In recent years, the distillate or full range of reformate is subject to selective hydrogenation in presence of Pd or Pt based noble metal catalysts, so as to remove olefins from reformate.

CN1004421B discloses a hydrorefining method of reformate, in which reformate with a bromine index in a range of 0.5-8 g bromine/100 g and an aromatic content in a range of 35% to 55% by weight is used as the raw material, the reaction is preformed at a temperature in a range of 200° C. to 300° C. and a partial pressure of hydrogen in a range of 5-20 kg/cm$^2$ with a liquid-volume space velocity in a range of 6 h$^{-1}$ to 20 h$^{-1}$ and a volume ratio of hydrogen to oil in a range of 200 to 1,000. A thin-shell strip-shaped Pd—Al$_2$O$_3$ catalyst with a Pd content in a range of 0.15% to 0.6% by weight (in relation to the support) is used.

CN1049001C discloses a hydrorefining method of reformate, in which reformate with a bromine index in a range of 0.5-8.0 g bromine/10.0 g is used as the raw material, and the hydrogenation catalyst is thin-shell Pd/γ-Al$_2$O$_3$ with a Pd content in a range of 0.15% to 6% by weight (in relation to the support). Aromatics with carbon number higher than 9 have been removed from the raw material, and the aromatic content is in a range of 20% to 85% by weight. The reaction temperature is in a range of 150° C. to 200° C., the partial pressure of hydrogen in the reactor is in a range of 0.5 MPa to 3.0 MPa, the liquid-volume space velocity is in a range of 3 h$^{-1}$ to 15 h$^{-1}$, and the volume ratio of hydrogen to oil is in a range of 100 to 500.

Both of the methods disclosed by CN1004421B and CN1049001C employ a trickle-bed hydrogenation process, a large quantity of circulating hydrogen has to be maintained in the apparatus. As a result, on one hand, a compressor for circulating hydrogen is required; on the other hand, the apparatus is bulky.

SUMMARY OF THE INVENTION

The object of the present invention is to provide a method for hydroprocessing reformate, which employs a liquid phase hydrogenation process, and thereby the demand for circulating hydrogen is eliminated, and the dissolved hydrogen innately contained in reformate can be fully utilized.

The inventors of the present invention has found in their practice that there is dissolved hydrogen derived from the catalytic reforming process in the reformate obtained by contacting hydrocarbon oil with a catalyst having a catalytic reforming action under catalytic reforming conditions and treating the resulted mixture by gas liquid separation in a gas liquid separating tank. If the reformate obtained from the bottom of the gas liquid separating tank is directly subject to liquid-phase hydroprocessing, the dissolved hydrogen innately contained in the reformate can be used as the hydrogen source or one of the hydrogen sources for hydroprocessing, as a result, the residual dissolved hydrogen in the reformate can be utilized fully to remove the olefins in the reformate, and the demand for circulating hydrogen can be eliminated. The present invention is implemented on the above basis.

The present invention provides a method for hydroprocessing reformate, comprising contacting reformate with a catalyst having a catalytic hydrogenation action under a liquid-phase hydroprocessing condition in a hydrogenation reactor, at least part of hydrogen gas for hydroprocessing is from dissolved hydrogen contained in the reformate.

According to the method for hydroprocessing reformate disclosed by the invention, the reformate separated from the reforming product separating tank is directly subjected to liquid-phase hydroprocessing, so that not only the dissolved hydrogen innately contained in the reformate is fully utilized, but also the olefins in the reformate are removed; at the same time, a demand for circulating hydrogen and circulating equipment thereof is eliminated. Therefore, the method for hydroprocessing reformate according to the present invention simplifies the process route, reduces capital cost and operation cost, and realizes efficient and energy-saving industrial production.

Furthermore, the reformate obtained by the method according to the present invention can achieve a bromine index lower than 50 mgBr$_{2/100}$ g or even lower than 10 mgBr$_{2/100}$ g, and a loss of aromatics less than 0.5% by weight.

BRIEF DESCRIPTION OF THE DRAWINGS

The accompanying drawings are provided herein to facilitate further understanding on the present invention, and constitute a part of the description, which are used in conjunction with the following embodiments to explain the present invention, but shall not be comprehended as constituting any limitation to the present invention. Among the drawings.

DETAILED DESCRIPTION OF THE EMBODIMENTS

Figure 1:
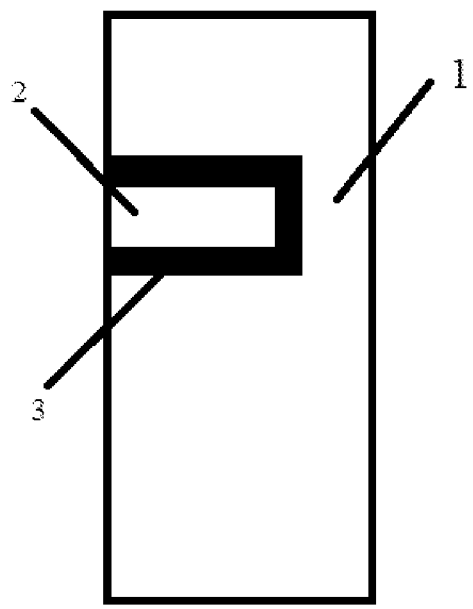
FIG. 1 is a schematic structural diagram of an embodiment of the mixing device used in the method for hydroprocessing reformate according to the present invention.

The present invention provides a method for hydroprocessing reformate, comprising contacting reformate with a catalyst having a catalytic hydrogenation action under a liquid-phase hydroprocessing condition in a hydrogenation reactor, at least part of hydrogen gas for hydroprocessing is from dissolved hydrogen contained in the reformate.

According to the method disclosed by the present invention, the reformate is obtained from bottom of gas liquid separating tank by injecting a catalytic reforming mixture into the gas liquid separating tank, the catalytic reforming mixture is obtained by contacting hydrocarbon oil with a catalyst having a reforming catalytic action under a catalytic reforming condition. That is, according to the method of present invention, a mixture obtained by contacting hydrocarbon oil with a catalyst having a catalytic reforming action under a catalytic reforming condition is subject to gas liquid separation in a gas liquid separating tank, and a reformate obtained from bottom of the separating tank is directly subjected to liquid-phase hydroprocessing.

According to the method disclosed by the present invention, the reformate contains residual hydrogen derived from the catalytic reforming process, and the reformate is obtained only after the reformed mixture output from the reforming reactor is treated by gas liquid separation; and thus, the hydrogen in the reformate (i.e., the residual hydrogen derived from the catalytic reforming process) exists substantially in form of dissolved hydrogen. In the present invention, the dissolved hydrogen in the reformate refers to the residual hydrogen gas derived from the catalytic reforming process. The content of the dissolved hydrogen in the reformate is slightly different depending on the conditions of gas liquid separation and the composition of the reformate. Generally, based on the total weight of the reformate, the reformate may contain the dissolved hydrogen in a content of 0.001-0.025% by weight.

According to the method disclosed by the present invention, when hydroprocessing the reformate, the hydrogen gas may solely come from the hydrogen innately contained in the reformate; alternatively, the hydrogen gas may come from the hydrogen innately contained in the reformate and hydrogen gas supplemented into the reformate. That is, according to the method disclosed by the present invention, the hydroprocessing may be carried out with or without supplemental hydrogen gas. The supplemental hydrogen gas refers to hydrogen gas injected into the reformate in one time or in several times before the contacting and/or during the contacting.

According to the method disclosed by the present invention, whether the supplemental hydrogen gas is required and the amount of the supplemental hydrogen gas may be determined appropriately according to the content of dissolved hydrogen in the reformate and the content of olefins in the reformate. In the case that the dissolved hydrogen in the reformate is enough to remove the olefins in the reformate to a satisfactory level, the residual dissolved hydrogen contained in the reformate, which is derived from the catalytic reforming process, is preferably used solely as the source of hydrogen for hydroprocessing without the supplemental hydrogen gas. In the case that the dissolved hydrogen in the reformate is not enough to remove the olefins in the reformate to a satisfactory level, according to the method disclosed by the present invention, the hydroprocessing is preferably carried out in presence of the supplemental hydrogen gas.

According to the method disclosed by the present invention, in the case that the supplemental hydrogen exists, the supplemental hydrogen may be injected into the reformate in one time, for example, the supplemental hydrogen gas may be injected into the reformate before the reformate is fed into the hydrogenation reactor. Alternatively, the supplemental hydrogen gas may be injected into the reformate in several times, for example, at least one supplemental hydrogen gas inlet may be arranged on the hydrogenation reactor, a part of the supplemental hydrogen gas is injected into the reformate at the inlet side of the hydrogenation reactor, while the remaining part of the supplemental hydrogen gas is injected into the reformate via the supplemental hydrogen gas inlet.

According to the method disclosed by the present invention, in the case that the supplemental hydrogen gas exists, the hydrogen gas may be injected into the reformate in a variety of ways.

In a preferred example of the present invention, the method for injecting the supplemental hydrogen gas into the reformate comprises injecting the supplemental hydrogen gas through pores with an average pore diameter in nanometer size into the reformate. By injecting the supplemental hydrogen gas through pores with an average pore diameter in nanometer size into the reformate, the supplemental hydrogen gas can be dispersed highly and dissolved more quickly in the reformate, so as to eliminate the demand for a diluent or circulating oil in the prior liquid-phase hydroprocessing of hydrocarbon oil for the purpose of increasing the amount of hydrogen carried in the raw oil.

In the present invention, the pores are through-holes. The pores may have an average pore diameter in a range of 1 nm to 1,000 nm, preferably in a range of 30 nm to 1,000 nm. For the purpose of further improving the degree of dispersion and the rate of dissolution of the supplemental hydrogen gas in the reformate, the pores more preferably have an average pore diameter in a range of 30 nm to 800 nm, even more preferably in a range of 50 nm to 500 nm. The average pore diameter is measured with a scanning electron microscopy.

The hydrogen gas may be injected into the reformate in a static state or in a flowing state. Preferably, the hydrogen gas is injected into the reformate in a flowing state, so that the hydrogen gas can be injected into the reformate during the period of transporting the reformate, and thereby the production efficiency can be further improved. In the case that the hydrogen gas is injected into the reformate in a flowing state, the hydrogen gas may be injected into the reformate at a rate of $v_1$ by $g \cdot h^{-1} \cdot m^{-2}$ (the total amount of the hydrogen gas passing through the pores in per unit area within per unit time), the reformate may have a flow rate of $v_2$ by $kg \cdot h^{-1} \cdot m^{-2}$ (the mass of reformate passing through per unit area of cross section within per unit time), ratio of $v_1/v_2$ may be in a range of 0.000625 to 0.09, so as to achieve a further improved effect of dispersing and dissolving hydrogen gas. Preferably, the ratio of $v_1/v_2$ is in a range of 0.005 to 0.01, so as to achieve better effect of dispersing and dissolving hydrogen gas, and higher production efficiency.

The hydrogen gas may be injected into the reformate at a rate in a range of 0.0001 $kg \cdot h^{-1} \cdot m^{-2}$ to 2,000 $kg \cdot h^{-1} \cdot m^{-2}$.

According to the method disclosed by the present invention, the supplemental hydrogen gas may be injected into the reformate through pores with an average pore diameter in nanometer size by a variety of methods. Preferably, the supplemental hydrogen gas is injected into the reformate by means of a mixing device, the mixing device comprises at least one liquid passage for accommodating the reformate and at least one gas passage for accommodating the supplemental hydrogen gas, the liquid passage is adjacent to the gas passage through a component, at least part of the component is a porous area having the pores with an average pore diameter in nanometer size, the supplemental hydrogen gas is injected into the reformate through the pores with an average pore diameter in nanometer size.

In the present invention, the term "liquid passage" refers to a space that can accommodate the reformate; the term "gas passage" refers to a space that can accommodate the supplemental hydrogen gas.

According to the method disclosed by the present invention, there is no particular restriction on the positional relationship between the liquid passage and the gas passage, as long as the liquid passage is adjacent to the gas passage through the component.

In an embodiment of the mixing device used in the method according to the present invention, as shown in FIG. 1, the gas passage 2 is disposed in the liquid passage 1, and the inner wall of the component 3 forms the gas passage 2.

Figure 2:
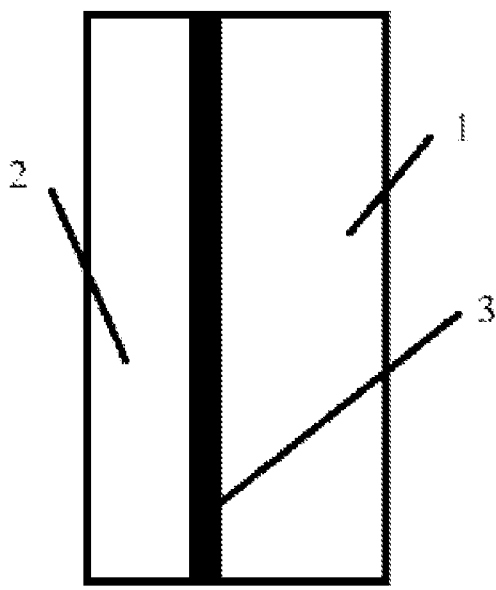
FIG. 2 is a schematic structural diagram of another embodiment of the mixing device used in the method for hydroprocessing reformate according to the present invention.

In another embodiment of the mixing device used in the method according to the present invention, as shown in FIG. 2, the gas passage 2 is disposed at a side of the liquid passage 1, the liquid passage 1 and the gas passage 2 are separated by the component 3.

Figure 3:
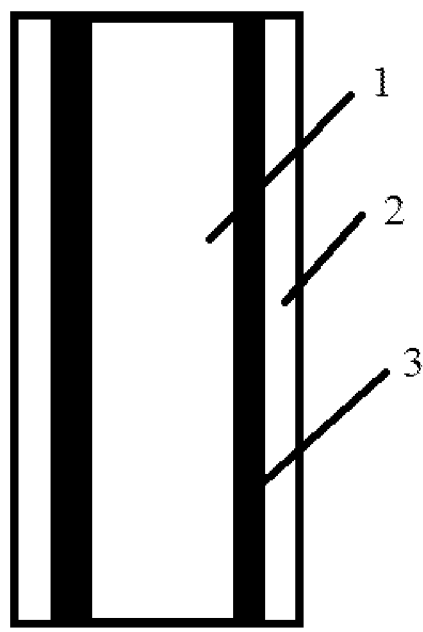
FIG. 3 is a schematic structural diagram of preferred embodiment of the mixing device used in the method for hydroprocessing reformate according to the present invention.

In a preferred embodiment of the mixing device used in the method according to the present invention, as shown in FIG. 3, the gas passage 2 surrounds outside of the liquid passage 1, the gas passage 2 and the liquid passage 1 are separated by the component 3.

At least part of the component is a porous area, which extends in the direction of the length of the component. Preferably, the porous area covers the entire component (i.e., the liquid passage is adjacent to the gas passage through the component having pores with an average pore diameter in nanometer size, and the supplemental hydrogen gas is injected through the pores with an average pore diameter in nanometer size into the reformate). The porous area has the pores with an average pore diameter in nanometer size, so as to inject the supplemental hydrogen gas through the pores with an average pore diameter in nanometer size into the reformate. The porous area preferably has a porosity in a range of 5-28%, so that enough supplemental hydrogen gas can be dispersed and dissolved in the reformate better. The porous area more preferably has a porosity in a range of 10-25%. The porosity refers to the percentage of the total volume of the pores in the porous area to the total volume of the porous area, and is measured by a nitrogen adsorption method.

According to the method disclosed by the present invention, the component may be any component that enables the supplemental hydrogen gas accommodated in the gas passage to pass through the pores and enter into the reformate accommodated in the liquid passage. Preferably, the component is a tube.

In an embodiment of the present invention, the component is made of a porous material having pores with an average pore diameter in nanometer size.

In another embodiment of the present invention, the component comprises a substrate and a porous membrane attached to the substrate, the substrate has pores, and the porous membrane may be disposed on surface of the substrate that contacts with the reformate accommodated in the liquid passage or on surface of the substrate that contacts with the supplemental hydrogen gas accommodated in the gas passage. Preferably, the porous membrane is disposed on surface of the substrate that contacts with the reformate accommodated in the liquid passage. The porous membrane has pores with an average pore diameter in nanometer size. There is no particular restriction on the average pore diameter of the pores in the substrate, as long as the gas can pass through the pores. Preferably, the through-holes in the substrate has an average pore diameter in micronmeter size (i.e., in a range of 1 μm to 1,000 μm) or in nanometer size (i.e., in a range of 1 nm to 1,000 nm), that is, the pores in the substrate may be in a range of 1 nm to 1000 μm.

In this embodiment, the component is preferably a membrane tube (i.e., the porous tube serves as a substrate, and the porous membrane is disposed on the inner wall and/or outer wall of the porous tube). The membrane tube may be any ordinary inorganic membrane tube (for example, inorganic ceramic membrane tube) or organic membrane tube, as long as the material of the membrane tube can not have any chemical interaction with the reformate and hydrogen gas.

According to the present invention, the component can be prepared with a conventional method or be available commercially, and it will not be further described in detailed herein.

According to the method disclosed by the present invention, in the case that the component is a tube, the tube may be used in combination with a housing. That is, the tube is disposed in a housing, and there is a space between the outer wall of the tube and the inner wall of the housing. The space enclosed by the inner wall of the tube is used as the liquid passage for accommodating the reformate, while the space formed between the outer wall of the tube and the inner wall of the housing is used as the gas passage for accommodating the supplemental hydrogen gas; alternatively, the space enclosed by the inner wall of the tube is used as the gas passage for accommodating the supplemental hydrogen gas, while the space formed between the outer wall of the tube and the inner wall of the housing is used as the liquid passage for accommodating the reformate. Preferably, the space enclosed by the inner wall of the tube is used as the liquid passage for accommodating the reformate, while the space formed between the outer wall of the tube and the inner wall of the housing is used as the gas passage for accommodating the supplemental hydrogen gas.

In the case that the component is a membrane tube, preferably the space that contacts with the porous membrane on the membrane tube is used as the liquid passage. For example, in the case that the porous membrane is disposed on the inner wall of the membrane tube, the space enclosed by the inner wall of the membrane tube is used as the liquid passage for accommodating the reformate, while the space formed between the outer wall of the membrane tube and the inner wall of the housing is used as the gas passage for accommodating the supplemental hydrogen gas.

Figure 4:
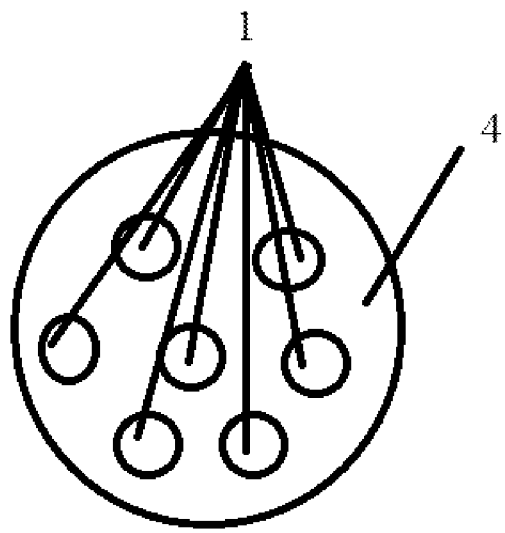
FIG. 4 is a cross sectional view of a preferred embodiment of the component with a porous area in the mixing device used in the method for hydroprocessing reformate according to the present invention.

According to the present invention, in the case that the component is a tube, the tube may have one or more liquid passages. For the purpose of further improving the efficiency of the method according to the present invention (i.e., more supplemental hydrogen gas can be dispersed and dissolved in the reformate in the same time), as shown in FIG. 4 (a cross section view of the tube), the inner wall of the tube 4 forms a plurality of liquid passages 1 parallel to each other (for example, 4-20 liquid passages). In the case that inner wall of the tube forms a plurality of liquid passages, preferably the liquid passages are distributed uniformly.

In the preferred embodiment, the housing may be any component that has a hollow structure and at least one opening, the opening is for connecting with a source of supplemental hydrogen gas or a reformate tank, to direct the supplemental hydrogen gas or the reformate into the space between the inner wall of the housing and the outer wall of the tube (i.e., the gas passage or liquid passage).

According to the method disclosed by the present invention, the amount of the supplemental hydrogen gas may be determined appropriately according to the saturated solubility of hydrogen gas in the reformate and the chemical hydrogen consumption of the reformate, as long as the hydrogenation product can meet the requirement.

According to the method disclosed by the present invention, in the case that the supplemental hydrogen gas is injected into the reformate through the pores with an average pore diameter in nanometer size, the supplemental hydrogen gas can be dispersed highly and dissolved more quickly in the reformate. Therefore, the method according to the present invention, the amount of hydrogen gas carried in the hydrocarbon oil is enough to meet the requirement, even if the hydrogen gas is not injected in a large amount into the reformate. Generally, according to the method disclosed by the present invention, the amount of the supplemental hydrogen gas may be 0.01-4 times of the saturated solubility of hydrogen gas in the reformate under the liquid-phase hydroprocessing condition, preferably 0.01-2 times of the saturated solubility, more preferably 0.1-1 time of the saturated solubility, even more preferably 0.1 time to less than 1 time of the saturated solubility. The saturated solubility refers to the saturated amount by gram of hydrogen gas dissolved in 100 g reformate under the liquid-phase hydroprocessing condition. The saturated solubility of hydrogen gas in the reformate can be determined with any conventional method in the art, which will not be described in detailed herein.

According to the method disclosed by the present invention, there is no particular restriction on the temperature and pressure of the reformate when injecting the supplemental hydrogen gas, which may be an ordinary choice in the art. Preferably, the supplemental hydrogen gas may be injected into the reformate at a temperature and a pressure for hydroprocessing.

According to the method disclosed by the present invention, the contact between the reformate and a catalyst having a catalytic hydrogenation action may be performed in any ordinary hydrogenation reactor in the art, and there is no particular restriction. According to the method disclosed by the present invention, the contact may be performed in a tank-type reactor or a tubular reactor. Preferably, the contact is performed in a tubular reactor.

In the present invention, the tubular reactor refers to a reactor with a high ratio of length to inner diameter, for example, the tubular reactor may have a ratio of length to inner diameter in a range of 5-50:1. According to the present invention, the inner diameter of the tubular reactor is preferably in a range of 20 mm to 1,000 mm.

In the case that the contact is performed in a tubular reactor, hydrogen gas may be injected by means of the mixing device described above into the reformate. In that case, amount of the mixing devices may be one or more.

In the case that the amount of the mixing device is one, the mixing device is preferably arranged at the inlet side of the tubular reactor, and hydrogen gas is injected into the reformate by means of the mixing device during transporting the reformate into the tubular reactor. The mixing device may be arranged at the inlet side of the tubular reactor with a conventional method in the art, as long as the reformate can pass through the liquid passage in the mixing device and the supplemental hydrogen gas in the gas passage can be injected through the component into the reformate.

According to the method disclosed by the present invention, in the case that the hydrogen gas is injected into the reformate by means of the mixing device described above to obtain hydrogen-containing reformate and feed the hydrogen-containing reformate into the reactor, an outlet O for outputting the hydrogen-containing reformate on the mixing device may have a inner diameter of $r_1$, an inlet I for inputting the hydrogen-containing reformate on the reactor may have a inner diameter of $r_2$, ratio of $r_1/r_2$ may be in a range of 0.6 to 1. A tube connecting the outlet O to the inlet I may have an inner diameter of $r_3$, ratio of $r_1/r_3$ may be in a range of 0.85 to 1.5. As a result, the hydrogen-containing reformate is more stable in the transportation process, and thereby a better hydrogenation effect can be obtained.

According to the method disclosed by the present invention, besides at least one mixing device arranged at the inlet side of the tubular reactor, at least one mixing device is preferably arranged on the tubular reactor; thus, the supplemental hydrogen gas can be injected in several times into the reformate according to the chemical hydrogen consumption of the reformate and the hydrogen content in the reformate, so as to further improve the efficiency of the method according to the present invention.

The mixing devices may be arranged on the tubular reactor with a variety of methods. For example, as shown in FIG. 1, the space enclosed by the inner wall of the tubular reactor is used as the liquid passage, and an opening is arranged on the tube wall of the tubular reactor; a component having pores with an average pore diameter in nanometer size is formed into a tube sealed at one end, and the space enclosed by the inner wall of the tube is used as the gas passage; the tube extends through the opening into the tubular reactor (the outer wall of the tube is hermetically connected to the opening), the end of the tube in the tubular reactor is the sealed end, and the other end of the tube is for connecting with the source of supplemental hydrogen gas, so that the supplemental hydrogen gas is injected into the tubular reactor through the tube.

In a preferred embodiment of the method according to the present invention, the hydrogenation reaction is performed in the tubular reactor, and the mixing device preferably comprising a tube as the component, and a housing that is used in combination with the tube, wherein, the space enclosed by the inner wall of the tube serves as the liquid passage, the space formed between the outer wall of the tube and the inner wall of the housing serves as the gas passage, and the liquid passage is connected with the space for performing hydrogenation reaction in the tubular reactor.

According to the method disclosed by the present invention, the amount of the reactor for hydrogenation reaction may be one or more (i.e., two or more). In the case that two or more reactors are used, the reactors may be connected in series connection or in parallel connection. In the case that two or more reactors are used, the supplemental hydrogen gas is preferably fed into the reformate at the inlet side of each hydrogenation reactor (for example, a mixing device described above is arranged at the inlet side of each hydrogenation reactor to feed the supplemental hydrogen gas into the reformate).

According to the method disclosed by the present invention, the catalyst having a catalytic hydrogenation action may be in any form. Preferably, the hydrogenation reactor is a fixed-bed reactor. In the case that the hydrogenation reactor is fixed-bed reactor, the amount of the catalyst beds may be an ordinary choice in the art, for example, the catalyst beds may be one; alternatively, the catalyst beds may be two or more. According to the method disclosed by the present invention, in the case that the hydrogenation reaction is performed in the fixed-bed reactors, the volume space velocity of the reformate may be in a range of 5 $h^{-1}$ to 20 $h^{-1}$, preferably in a range of 10 $h^{-1}$ to 20 $h^{-1}$.

In a preferred embodiment of the present invention, the hydrogenation is performed in tubular fixed-bed hydrogenation reactors.

The method according to the present invention attains the object of the present invention by utilizing residual dissolved hydrogen in reformate derived from a catalytic reforming process. There is no particular restriction on the condition of the liquid-phase hydroprocessing, which may be an ordinary choice in the art. Usually, the liquid-phase hydroprocessing condition comprises: temperature may be in a range of 130° C. to 200° C., preferably in a range of 140° C. to 160° C.; pressure by gage pressure may be in a range of 1.5 MPa to 3.5 MPa, preferably in a range of 1.5 MPa to 2 MPa.

According to the method disclosed by the present invention, the catalyst having a catalytic hydrogenation action may be any commonly used catalyst having a catalytic hydrogenation action in the art, and it will not be described in detailed herein.

According to the method disclosed by the present invention further comprises removing light constituents in the product obtained in the contact (i.e., hydroprocessing), so as to remove the light constituents generated in the catalytic reforming and hydroprocessing (for example, constituents with a carbon number lower than 5) in the product obtained in the hydroprocessing. According to the method of the present invention, there is no particular restriction on method for removing the light constituent, which may be a conventional method in the art. Usually, the hydrogenated product may be heated up, so as to remove the light constituents in the hydrogenated product.

According to the method disclosed by the present invention, in the case that the light constituents in the hydrogenated product are removed by heating up the hydrogenated product, the method according to the present invention further comprises removing light constituents in product obtained by contacting, to obtain light constituent-removed oil, reformate is fed into the hydrogenation reactor after exchanging heat with the light constituent-removed oil. In that way, the residual heat in the light constituent-removed oil can be utilized fully to warm up the reformate, thereby eliminating the demand for a preheating furnace for the reformate, and further reducing the capital cost and energy consumption of the equipment of method according to the present invention.

In the case that the hydrogenated product obtained by the method according to the present invention is mainly used to prepare aromatic, the method according to the present invention may further comprise removing heavy constituents in the light constituent-removed oil to obtain a raw material for aromatics extraction. The heavy constituents in the light constituent-removed oil may be removed by any conventional method in the art, which will not be described in detailed herein.

Figure 5:
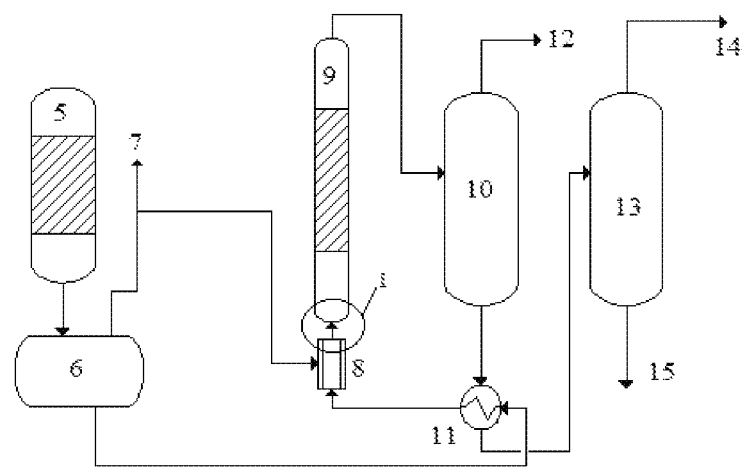
FIG. 5 shows a preferred embodiment of the method for hydroprocessing reformate according to the present invention.

FIG. 5 shows a preferred embodiment of the method according to the present invention. According to the preferred embodiment, hydrocarbon oil contacts with a catalyst having a reforming catalytic action under a condition of catalytic reforming in catalytic reforming reactor 5, to obtain a catalytic reforming mixture; the obtained catalytic reforming mixture is injected into a gas liquid separating tank 6 for gas liquid separation, to remove volatile constituents 7, and obtain reformate from the bottom of the gas liquid separating tank; a predefined amount of hydrogen gas is injected into the obtained reformate to mix with the reformate if necessary, and then hydrogen-containing reformate is injected into hydrogenation reactor 9 (preferably a tubular reactor) to contact with a catalyst having a catalytic hydrogenation action under a liquid-phase hydroprocessing condition; the hydrogenated product output from the hydrogenation reactor 9 is fed into light constituent removing tower 10 to remove light constituents 12, so as to obtain light constituent-removed oil from bottom of the light constituent removing tower 10; the obtained light constituent-removed oil exchanges heat with reformate in a heat exchanger 11 before the reformate is injected into a mixing device; after heat exchange, the light constituent-removed oil is injected into a heavy constituent removing tower 13 for separation, so as to obtain a heavy constituents 15 from bottom of the heavy constituent removing tower 13 and a raw material 14 for aromatics extraction at the top of tower.

Figure 6:
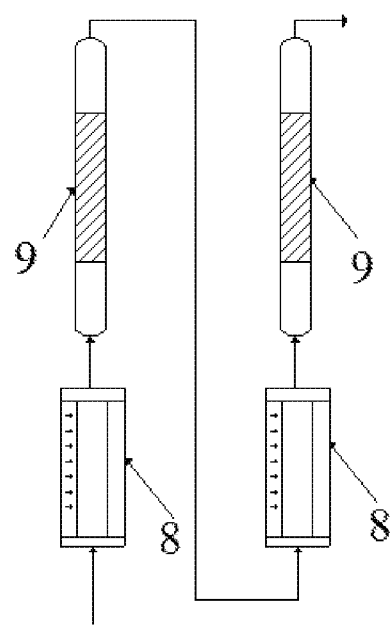
FIG. 6 shows an embodiment of the serial connection of a plurality of hydrogenation reactors in the method for hydroprocessing reformate according to the present invention.
Figure 7:
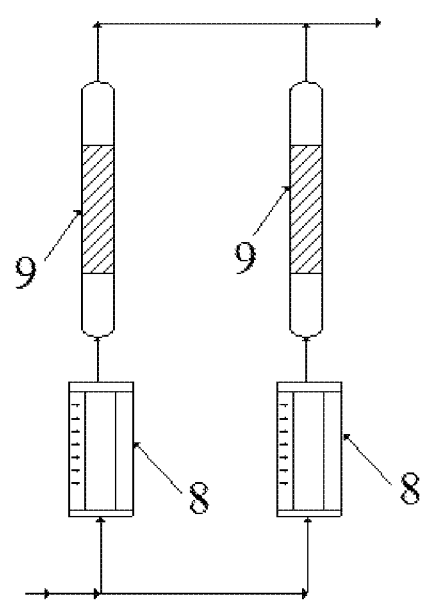
FIG. 7 shows an embodiment of the parallel connection of a plurality of hydrogenation reactors in the method for hydroprocessing reformate according to the present invention.

According to the embodiment, a plurality of hydrogenation reactors can be arranged, and the hydrogenation reactors can be connected in series or in parallel. In the case that the hydrogenation reactors are connected in series, in the flowing direction of the reformate, the mixing device may be arranged at the inlet side of the first hydrogenation reactor; alternatively, as shown in FIG. 6, a mixing device 8 may be arranged at the inlet side of each hydrogenation reactor 9. In the case that a plurality of the hydrogenation reactors are connected in parallel, only one mixing device may be arranged, to mix the reformate with hydrogen gas; then, the obtained mixture is fed into the hydrogenation reactors connected in parallel respectively; alternatively, as shown in FIG. 7, a mixing device 8 may be arranged at the inlet side of each hydrogenation reactor 9.

Figure 8:
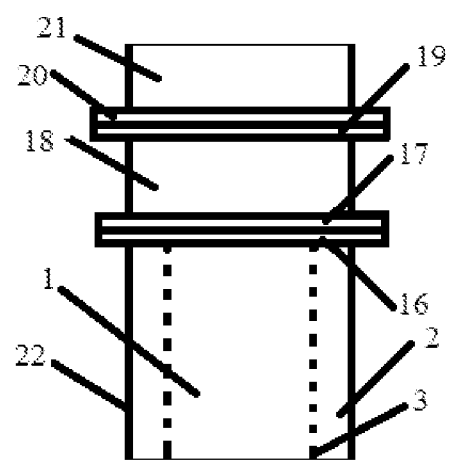
FIG. 8 shows the part I in FIG. 5.

FIG. 8 is provided to illustrate the part I in FIG. 5, and shows the structure of the mixing device 8 in FIG. 5 and the connection relationship between the mixing device 8 and the hydrogenation reactor 9.

As shown in FIG. 8, the mixing device 8 comprises gas passage 2 and liquid passage 1, and the gas passage 2 and the liquid passage 1 are adjacent by a component 3, wherein, the inner wall of the component 3 forms the liquid passage 1, while the outer wall of the component 3 and the inner wall of housing 22 form the gas passage 2; the two ends of the gas passage 2 are sealed, and the housing 22 has an opening (not shown) for connecting with a source of hydrogen gas. The mixing device 8 is connected to inlet line 18 of tubular reactor 9. During operation, the reformate flows into the hydrogenation reactor 9 through the liquid passage 1; as the reformate flows through the liquid passage 1, the supplemental hydrogen gas in the gas passage 2 is injected through the component 3 into the reformate and thereby is dispersed and dissolved in the reformate; then, the hydrogen-containing reformate enters into the hydrogenation reactor 9, to perform hydrogenation reaction in presence of a catalyst having a catalytic hydrogenation action.

The mixing device 8 may be connected to the inlet line 18 in a variety of ways, for example, a flange may be arranged on each end of the mixing device 8 (one of the flanges 16 is shown in FIG. 8), and each flange is hermetically connected with a flange on the corresponding inlet line (as shown in FIG. 8, the flange 16 on one end of the mixing device is hermetically connected with the flange 17 on the inlet line 18); the other end of the inlet line 18 is connected through flanges 19 and 20 to the inlet side 21 of the hydrogenation reactor 9.

Hereinafter, the present invention will be described in detailed combining with some examples and comparative examples.

In the following examples and comparative examples, the bromine index is measured by potentiometric titration.

In the following examples and comparative examples, the aromatic content is measured by gas chromatography.

In the following examples and comparative examples, the average pore diameter is measured by scanning electron microscopy.

In the following examples and comparative examples, all pressure values are gage pressure.

Examples 1 to 6 are provided herein to illustrate the method according to the present invention.

Example 1

(1) As shown in FIG. 5, a catalytic reforming mixture output from a reforming reactor is injected into a gas liquid separating tank of reforming product for gas liquid separation, and a reformate is obtained from bottom of the gas liquid separating tank. Wherein, the temperature is 40° C. and the pressure is 0.7 MPa in the gas liquid separating tank. Based on the total weight of obtained reformate, the reformate contains dissolved hydrogen in an amount of 0.015% by weight.

(2) Supplemental hydrogen gas is injected by means of a mixing device to the reformate as raw oil (the chemical hydrogen consumption of 100 parts by weigh raw oil is 0.03 parts by weigh, and, under the hydrorefining condition as shown in table 1, the saturated solubility of hydrogen gas in the raw oil is 0.025% by weight). The injection rate of hydrogen gas is 2435 $g \cdot h^{-1} \cdot m^{-2}$, and the ratio of the injection rate of hydrogen gas (by $g \cdot h^{-1} \cdot m^{-2}$) to the flow rate of raw oil (by $kg \ h^{-1} \cdot m^{-2}$) is 0.006. The hydrogen-containing reformate is fed through a tube with an inner diameter of 40 mm into a tubular fixed-bed reactor (with an inner diameter of 65 mm, and a ratio of length to diameter of 30. There is one catalyst bed with a ratio of height to diameter of 25 in the tubular fixed-bed reactor), and contacts with a catalyst having a catalytic hydrogenation action under the condition as shown in table 1. The aromatic content and bromine index of the obtained hydrogenated product are shown in table 2.

The mixing device comprises a tube made of a porous material (purchased from Beijing Zhongtianyuan Environmental Engineering Co., Ltd., the outer diameter is 25.4 mm, the cross section of the tube is as shown in FIG. 4, the tube has 19 uniformly distributed liquid passages, the inner diameter of each liquid passage is 3.3 mm, the average pore diameter of the pores in the tube wall is 50 nm, the percentage of the quantity of pores with a pore diameter in a range of 50 nm to 55 nm to the total quantity of pores is 95%, and the porosity is 20%) and a housing (with a inner diameter of 40 mm) to be used with the tube in combination. The space formed between the outer wall of the tube and the inner wall of the housing serves as a gas passage. The inner diameter of the outlet for outputting hydrogen-containing hydrocarbon oil on the mixing device is 40 mm.

The temperature is 160° C. and the pressure is 1.8 MPa in the liquid passages of the mixing device. The catalyst having a catalytic hydrogenation action is catalyst HDO-18 from Fushun Research Institute of Petroleum and Petrochemicals, Sinopec.

(3) The obtained hydrogenated product is injected into a light constituents removing tower to remove light constituents with a carbon number lower than 5 in the mixture resulted from the hydroprocessing, to obtain a light constituent-removed oil. Subsequently, the light constituent-removed oil exchanges heat with the reformate in a heat exchanger followed by injecting the light constituent-removed oil into a heavy constituent removing tower to remove heavy constituent with a carbon number higher than 8, to obtain a raw material for aromatics extraction at the tower top.

Example 2

The reformate is hydroprocessed with the same method as described in Example 1, but the difference is in that no hydrogen gas is fed into the gas passage of the mixing device (i.e., no supplemental hydrogen gas is injected into the reformate). The aromatic content and bromine index of the obtained hydrogenated product are shown in table 2.

Example 3

The reformate is hydroprocessed with the same method as described in Example 1, but the difference is as indicated below.

In step (1), the temperature is 40° C. and the pressure is 0.3 MPa in the gas liquid separating tank. Based on the total weight of the obtained reformate, the reformate contains dissolved hydrogen in an amount of 0.01% by weight.

In the step (2), the mixing device comprises a membrane tube (purchased from Beijing Zhongtianyuan Environmental Engineering Co., Ltd., the outer diameter is 25.4 mm, the average pore diameter of the pores in the substrate is 100 μm, the average pore diameter of the pores in the porous membrane is 250 nm, the percentage of the quantity of pores with a pore diameter in a range of 250 nm to 260 nm to the total quantity of pores is 95%, and the porosity is 25%) and a housing (with a inner diameter of 40 mm) to be used with the tube in combination. The porous membrane is disposed on the outer wall of the membrane tube; the cross section of the membrane tube is as shown in FIG. 4. The membrane tube has 7 uniformly distributed liquid passages, and the inner diameter of each liquid passage is 6 mm. The space formed between the outer wall of the membrane tube and the inner wall of the housing serves as a gas passage.

The temperature is 150° C. and the pressure is 1.5 MPa in the liquid passages of the mixing device. The chemical hydrogen consumption of 100 parts by weigh raw oil is 0.03 parts by weigh, and the saturated solubility of hydrogen gas in the raw oil is 0.025% by weight under the hydrorefining condition as shown in table 1. The injection rate of hydrogen gas is 2,180 $g \cdot h^{-1} \cdot m^{-2}$, and the ratio of the injection rate of hydrogen gas (by $g \cdot h^{-1} \cdot m^{-2}$) to the flow rate of raw oil (by $kg \cdot h^{-1} \cdot m^{-2}$) is 0.007. The catalyst is catalyst HDO-18 from Fushun Research Institute of Petroleum and Petrochemicals, Sinopec.

The aromatic content and bromine index of the hydrogenated product obtained in the hydroprocessing under the condition shown in table 1 are shown in table 2.

Example 4

The reformate is hydroprocessed with the same method as described in example 1, but the difference is as indicated below.

In the step (2), the mixing device comprises a membrane tube (purchased from Beijing Zhongtianyuan Environmental Engineering Co., Ltd., the outer diameter is 25.4 mm, the average pore diameter of the pores in the substrate is 100 µm, the average pore diameter of the pores in the porous membrane is 500 nm, the percentage of the quantity of pores with a pore diameter in a range of 500 nm to 550 nm to the total quantity of pores is 95%, and the porosity is 25%) and a housing (with a inner diameter of 40 mm) to be used with the tube in combination. The porous membrane is disposed on the inner wall of the membrane tube; the cross section of the membrane tube is as shown in FIG. 4. The membrane tube has 19 uniformly distributed liquid passages, and the inner diameter of each liquid passage is 3.3 mm. The space formed between the outer wall of the membrane tube and the inner wall of the housing serves as a gas passage.

The aromatic content and bromine index of the hydrogenated product obtained in the hydroprocessing under the condition shown in table 1 are shown in table 2.

Example 5

The reformate is hydroprocessed with the same method as described in example 4, but the difference is in that in the mixing device, the average pore diameter of the pores in the tube wall of the tube made of a porous material is 5 µm (the tubes are from Beijing Zhongtianyuan Environmental Engineering Co., Ltd.). The aromatic content and bromine index of the obtained hydrogenated product are shown in table 2.

Example 6

The reformate is hydroprocessed with the same method as described in example 4, but the difference is in that the fixed-bed reactor is a fixed bed tank-type reactor (the inner diameter is 1600 mm, there is one catalyst bed with a ration of height to diameter of 6.0 arranged in the reactor). The properties of the obtained hydrogenated product are shown in table 2.

hydrogen gas, by injecting the supplemental hydrogen gas into the reformate through pores with an average pore diameter in nanometer size, the supplemental hydrogen gas can be dispersed highly and dissolved more quickly in the reformate, and thereby a better hydroprocessing effect can be achieved.

While some preferred Examples of the present invention are described above, the present invention is not limited to the details in those Examples. The person skilled in the art can make modifications and variations to the technical scheme of the present invention, without departing from the spirit of the present invention. However, all these modifications and variations shall be deemed as falling into the protected domain of the present invention.

Moreover, different embodiments of the present invention can be combined freely as required, as long as the combinations do not deviate from the ideal and spirit of the present invention. However, such combinations shall also be deemed as falling into the scope disclosed by the present invention.

The invention claimed is:

1. A method for hydroprocessing reformate, comprising:
contacting a hydrocarbon oil with a catalyst having a catalytic reforming function to obtain a catalytic reforming mixture;
separating the catalyst reforming mixture in a gas-liquid separator to obtain a reformate, wherein the reformate is a liquid with hydrogen dissolved therein;
injecting a supplemental hydrogen into the reformate through a plurality of pores having an average pore diameter of 1 nm to 1,000 nm in a mixing device to obtain an hydrogen enriched reformate;
introducing the hydrogen enriched reformate that exits from an outlet of the mixing device into an inlet of a hydrogenation reactor containing a catalyst having a catalytic hydrogenation function; and

TABLE 1

| Process Condition | Example 1 | Example 2 | Example 3 | Example 4 | Example 5 | Example 6 |
|---|---|---|---|---|---|---|
| Reaction pressure/MPa | 1.8 | 1.8 | 1.5 | 1.8 | 1.8 | 1.8 |
| Reaction temperature/° C. | 160 | 160 | 150 | 160 | 160 | 160 |
| Volume space velocity of reformate/h$^{-1}$ | 20 | 15 | 15 | 10 | 10 | 10 |
| Amount of supplemental hydrogen gas/wt % | 0.015 | 0 | 0.02 | 0.02 | 0.02 | 0.02 |

TABLE 2

| Properties of hydrocarbon oil | Raw oil | Example 1 | Example 2 | Example 3 | Example 4 | Example 5 | Example 6 |
|---|---|---|---|---|---|---|---|
| Density (20° C.)/ g · cm$^{-3}$ | 0.799 | 0.799 | 0.798 | 0.799 | 0.801 | 0.803 | 0.798 |
| Aromatics content/ wt % | 75.01 | 74.71 | 75.0 | 74.7 | 74.67 | 75.04 | 74.56 |
| Bromine index/ mgBr/100 g | 2300 | 3.5 | 937 | 33 | 46 | 112 | 233 |

The result of example 2 indicates that the dissolved hydrogen innately contained in the reformate can be utilized to effectively carry out hydroprocessing of the reformate.

The results of examples 4 and 5 indicate that under the condition of the same injection amount of supplemental withdrawing a hydrogenated reformate from an outlet of the hydrogenation reactor.

2. The method according to claim 1, wherein the supplemental hydrogen gas is injected into the reformate in one or more locations.

3. The method according to claim 1, wherein the reformate comprises 0.001-0.025 wt % of the dissolved hydrogen based on a total weight of the reformate.

4. The method according to claim 1, wherein the mixing device comprises at least one liquid passage for accommodating the reformate and at least one gas passage for accommodating the supplemental hydrogen gas, and a porous nozzle having the plurality of pores, the supplemental hydrogen gas is injected into the reformate through the plurality of pores in the nozzle.

5. The method according to claim 3, wherein the average pore diameter is in a range of 30 nm to 1,000 nm.

6. The method according to claim 2, wherein an amount of the supplemental hydrogen gas injected is 0.01 to 4 times of a saturated solubility of hydrogen in the reformate, the saturated solubility is measured at a temperature and under a pressure in the hydrogenation reactor.

7. The process according to claim 6, wherein the amount of the supplemental hydrogen gas is 0.1 times to less than 1 time of the saturated solubility.

8. The method according to claim 1, further comprising removing light constituents in the hydrogenated reformate to obtain a light constituent-removed oil, and exchanging heat between the reformate and the light constituent-removed oil prior to feeding the reformate into the hydrogenation reactor.

9. The method according to claim 1, wherein the hydrogenation reactor is a tubular fixed-bed hydrogenation reactor.

10. The method according to claim 9, wherein the reformate has a volume space velocity in a range of 5 $h^{-1}$ to 20 $h^{-1}$.

11. The method according to claim 1, further comprising injecting the supplemental hydrogen into the hydrogen enriched reformate during the step of contacting the hydrogen enriched reformate with the catalyst having the catalytic hydrogenation function.

12. The method according to claim 1, wherein a temperature in the hydrogenation reactor is in a range of 130° C. to 200° C. and a pressure by gage pressure in the hydrogenation reactor is in a range of 1.5 MPa to 3.5 MPa.

13. The method according to claim 1, wherein contacting the reformate with the catalyst having the catalytic hydrogenation function is carried out without the presence of diluent and/or circulating oil.

* * * * *